(12) United States Patent
Bitterolf et al.

(10) Patent No.: US 11,467,564 B2
(45) Date of Patent: Oct. 11, 2022

(54) CONTROLLER STRUCTURE FOR MIXED DIRECT/INDIRECT DRIVING OF A MACHINE ELEMENT

(71) Applicant: SIEMENS AKTIENGESELLSCHAFT, Munich (DE)

(72) Inventors: David Bitterolf, Erlangen (DE); Sven Tauchmann, Chemnitz (DE)

(73) Assignee: Siemens Aktiengesellschaft, Munich (DE)

( * ) Notice: Subject to any disclaimer, the term of this patent is extended or adjusted under 35 U.S.C. 154(b) by 389 days.

(21) Appl. No.: 16/635,866

(22) PCT Filed: May 2, 2019

(86) PCT No.: PCT/EP2019/061277
§ 371 (c)(1),
(2) Date: Jan. 31, 2020

(87) PCT Pub. No.: WO2019/219398
PCT Pub. Date: Nov. 21, 2019

(65) Prior Publication Data
US 2020/0159189 A1    May 21, 2020

(30) Foreign Application Priority Data

May 16, 2018 (EP) ..................................... 18172646

(51) Int. Cl.
*G05B 19/416* (2006.01)
(52) U.S. Cl.
CPC .. *G05B 19/416* (2013.01); *G05B 2219/32063* (2013.01)
(58) Field of Classification Search
CPC .................... G05B 19/416; G05B 2219/32063
See application file for complete search history.

(56) References Cited

U.S. PATENT DOCUMENTS 4,126,821 A * 11/1978 Cannon ................. G05B 19/40
327/100
4,145,204 A * 3/1979 Farkas ................... G05B 19/07
700/158

(Continued)

FOREIGN PATENT DOCUMENTS

DE    102014005664 B3    9/2015
EP        2174748 A1    4/2010

OTHER PUBLICATIONS

International Search Report issued by the European Patent Office in International Application PCT/EP2019/061277.

*Primary Examiner* — Ronald D Hartman, Jr.
(74) *Attorney, Agent, or Firm* — Henry M. Feiereisen LLC

(57) ABSTRACT

A first drive operates directly on a machine element, whereas a second drive operates on a machine element via a speed-changing device. A position controller receives a position setpoint value and a position actual value of the machine element and determines therefrom a speed setpoint value for the machine element. A first determining device receives the speed setpoint value and determines a resulting speed setpoint value using the speed setpoint value. A first speed controller determines a first force setpoint value from the resulting speed setpoint value and the speed actual value of the machine element and controls the first drive depending on the first force setpoint value. A second speed controller determines a second force setpoint value from the resulting speed setpoint value and the speed actual value of the second drive and controls the second drive depending on the force setpoint value.

16 Claims, 3 Drawing Sheets

(56) References Cited

U.S. PATENT DOCUMENTS

| | | | | | |
|---|---|---|---|---|---|
| 4,506,321 | A | * | 3/1985 | Comstock | G05B 19/416 318/561 |
| 4,568,866 | A | * | 2/1986 | Flora | G05B 19/40 700/63 |
| 4,800,482 | A | * | 1/1989 | Hosaka | G05B 19/23 399/361 |
| 5,072,399 | A | * | 12/1991 | Laws | G05B 19/4141 700/186 |
| 6,230,078 | B1 | * | 5/2001 | Ruff | G05B 19/0426 710/63 |
| 2003/0187542 | A1 | * | 10/2003 | Endo | G05B 19/19 700/186 |
| 2004/0088061 | A1 | * | 5/2004 | Nakashima | G05B 19/40 700/304 |
| 2004/0153175 | A1 | * | 8/2004 | Tisue | G05B 19/40 700/56 |
| 2005/0113959 | A1 | * | 5/2005 | Kajiyama | G05B 19/414 700/181 |
| 2008/0269915 | A1 | * | 10/2008 | Endo | G05B 19/416 700/13 |
| 2010/0171458 | A1 | | 7/2010 | Hamaguchi et al. | |

* cited by examiner

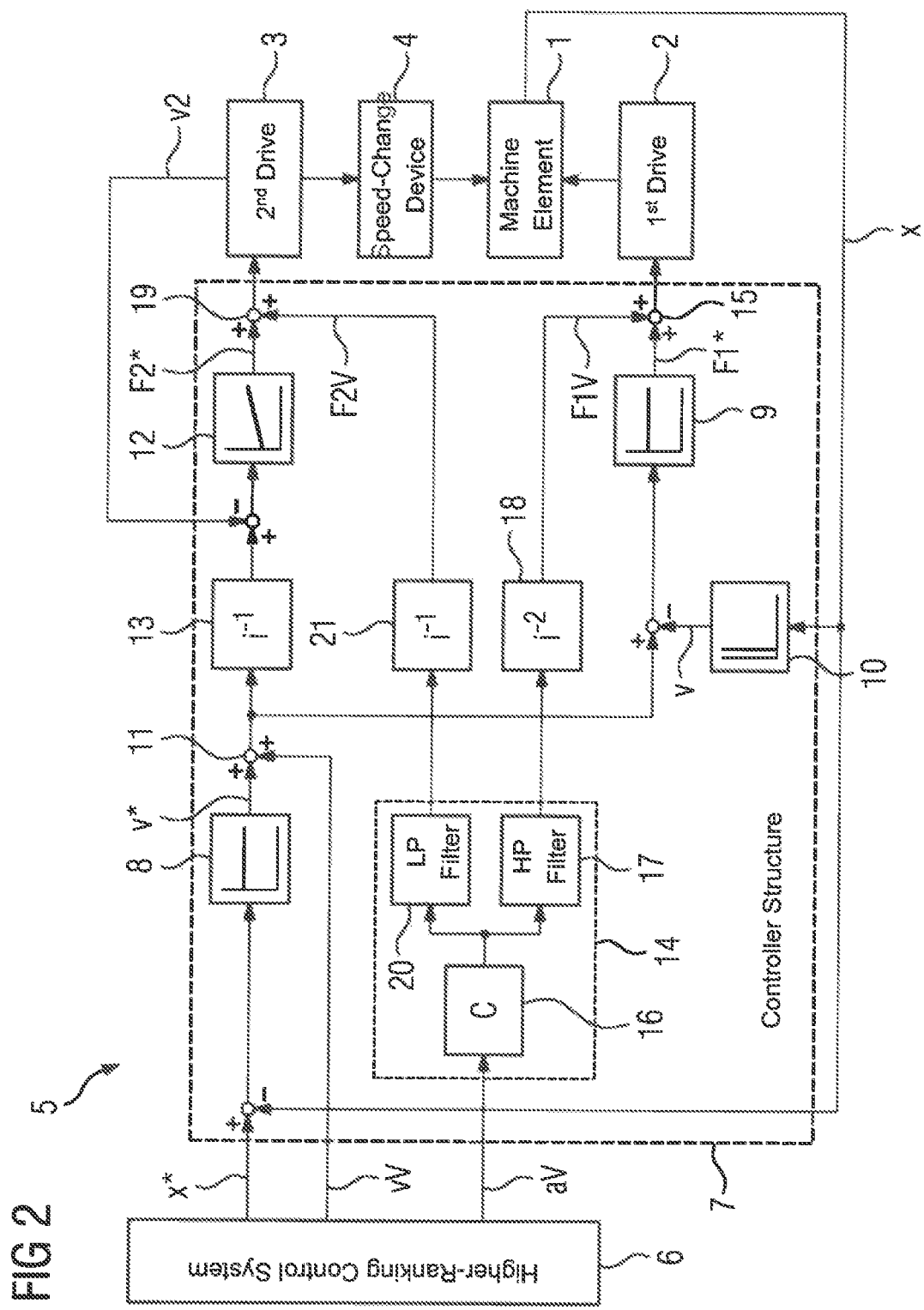

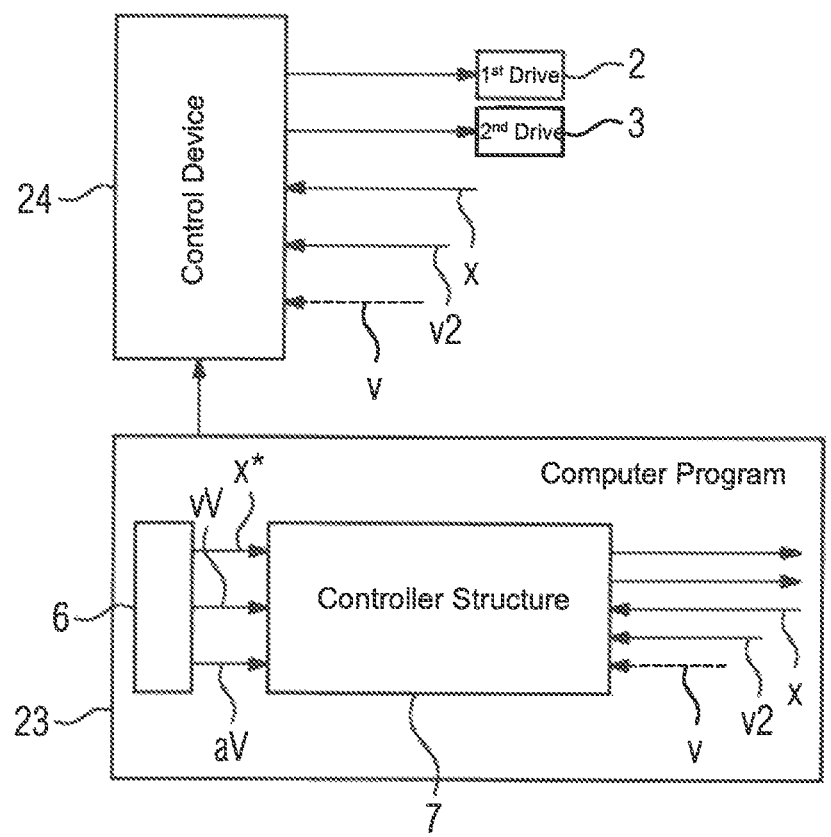

CONTROLLER STRUCTURE FOR MIXED DIRECT/INDIRECT DRIVING OF A MACHINE ELEMENT

CROSS-REFERENCES TO RELATED APPLICATIONS

This application is the U.S. National Stage of International Application No. PCT/EP2019/061277, filed May 2, 2019, which designated the United States and has been published as International Publication No. WO 2019/219398 A1 and which claims the priority of European Patent Application, Serial No. 18172646.4, filed May 16, 2018, pursuant to 35 U.S.C. 119(a)-(d).

BACKGROUND OF THE INVENTION

The present invention is based on a controller structure for a first and a second drive, wherein the first drive acts directly on a machine element and the second drive acts on the machine element via a speed-changing device,
  wherein the controller structure includes a position controller, which in each case receives a position setpoint value and a position actual value of the machine element with a position-control clock pulse and controls the second drive depending on the respective position setpoint value and the respective position actual value,
  wherein the controller structure includes a first speed controller, which in each case receives a resulting speed setpoint value and a speed actual value of the machine element with a first speed-control clock pulse, in each case determines a first force setpoint value on the basis of the respective resulting speed setpoint value and the respective speed actual value of the machine element for the first drive and controls the first drive depending on the respective first force setpoint value,
  wherein the controller structure comprises a first determining device, which determines the respective resulting speed setpoint value and outputs this to the first speed controller.

The present invention is further based on a control device for a first and a second drive, wherein the first drive acts directly on a machine element and the second drive acts on the machine element via a speed-changing device,
  wherein the control device comprises a higher-ranking control system and a controller structure,
  wherein the higher-ranking control system specifies position setpoint values to the controller structure with a position-control clock pulse,
  wherein the controller structure is embodied as explained above.

The present invention is furthermore based on a machine, wherein the machine comprises a machine element, a first drive, a second drive and a speed-changing device,
  wherein the first drive acts directly on the machine element and the second drive acts on the machine element via the speed-changing device,
  wherein the first drive and the second drive are controlled by such a control device.

As a rule, machine axes consist of a drive, a speed-changing device and a machine element. In this case, the drive acts on the machine element via the speed-changing device. The disadvantage with this arrangement is the fact that a speed-changing device has relatively low rigidity and therefore at least the dynamics, and in many cases also the positioning accuracy of the machine element, are relatively low.

EP 2 174 748 A1 discloses a controller structure, a control device and a machine of the type mentioned in the introduction. With a suitable design of the control system of the first drive and the second drive, this configuration of the machine axis enables the machine element to be positioned with high dynamics and high positioning accuracy. In particular, the first drive can be used to transmit high-frequency force components and to damp process-oriented oscillations, while the second drive can withstand high static and low-frequency loads. However, EP 2 174 748 A1 does not disclose any further details of the configuration of the controller structure.

US 2010/0 171 458 A1 discloses a controller structure for a first and a second drive, wherein the first drive and the second drive act on the machine element via a respective speed-changing device, wherein the controller structure includes a position controller, which in case receives a position setpoint value and a position actual value of the machine element with a position-control clock pulse and controls the second drive depending on the respective position setpoint value and the respective position actual value, wherein the controller structure includes a first speed controller, which in each case receives a resulting speed setpoint value and a speed actual value of the machine element with a first speed-control clock pulse, in each case determines a first force setpoint value for the first drive on the basis of the respective resulting speed setpoint value and the respective speed actual value of the machine element and control the first drive depending on the respective first force setpoint value, wherein the controller structure comprises a first determining device, which determines the respective resulting speed setpoint value and outputs this to the first speed controller, wherein the position controller in each case determines a speed setpoint value for the machine element on the basis of the respective position setpoint value and the respective position actual value and outputs the respective speed setpoint value as an output signal, wherein the controller structure includes a second speed controller, which in each case receives the speed setpoint value output by the position controller and a speed actual value of the second drive with a second speed-control clock pulse, in each case determines a second force setpoint value for the second drive on the basis of this speed setpoint value and the respective speed actual value of the second drive and controls the second drive depending on the respective second force setpoint value.

Substantially the same situation may be derived from DE 10 2014 005 664 B3.

Hence, the object of the present invention consists in the provision of possibilities that enable optimal utilization of the potential offered by the drive structure in EP 2 174 748 A1.

SUMMARY OF THE INVENTION

According to one aspect of the invention, the object is achieved by a controller structure of the type mentioned in the introduction, which controller is configured such that
  the position controller in each case determines a speed setpoint value for the machine element on the basis of the respective position setpoint value and the respective position actual value and outputs the respective speed setpoint value as an output signal, the controller structure includes a second speed controller, which in each case receives the resulting speed setpoint value and a speed actual value of the second drive with a second speed-control clock pulse, in each case determines a second force setpoint value for the second drive on the basis of the respective resulting speed setpoint value and the respective speed actual value of the second drive and controls the second drive depending on the respective second force setpoint value, the first determining device receives the respective speed setpoint value, in each case determines the resulting speed setpoint value using the respective speed setpoint value and the first determining device also outputs the respective resulting speed setpoint value to the second speed controller in addition to the first speed controller.

Advantageous configurations of the controller structure are the subject matter of dependent claims.

The determination of the resulting speed setpoint value depending on both the position setpoint value and the position actual value—in particular depending on the difference between the position setpoint value and position actual value—in particular enables it to be achieved that, even in the case of faults that are unnoticeable in the position setpoint value, the first drive supports the correction of such faults with high dynamics.

In a preferred configuration of the controller structure, it is provided that the first determining device furthermore receives a respective speed pre-control value and determines the resulting speed setpoint value in each case as the sum of the respective speed setpoint value and the respective speed pre-control value. This configuration enables the dynamics in the positioning of the machine element to be still further improved.

In a further preferred configuration of the controller structure, it is provided that the controller structure comprises a second determining device, which in each case receives an acceleration pre-control value with a pre-control clock pulse, a respective first force pre-control value for the first drive on the basis of the respective acceleration pre-control value and outputs the respective first force pre-control value to a first addition device, which adds the respective first force pre-control value to the respective first force setpoint value so that the first drive is controlled in accordance with the sum of the respective first force pre-control value and the respective first force setpoint value. This configuration enables the dynamics in the positioning of the machine element, in particular in the event of changes to the position setpoint value—which as a rule are known in advance—to be improved.

The second determining device preferably comprises an adjusting device, which converts the respective acceleration pre-control value into a provisional force pre-control value. In this case, the second determining device determines the respective first force pre-control value on the basis of the respective provisional force pre-control value.

The second determining device preferably determines the respective first force pre-control value by high-pass filtering of the respective provisional force pre-control value. This enables the dynamics in the positioning of the machine element to be still further improved.

In a particularly preferred configuration of the controller structure, it is provided that, in addition to the respective first force pre-control value, the second determining device also determines a respective second force pre-control value for the second drive on the basis of the respective provisional force pre-control value. In this case, the second determining device outputs the respective second force pre-control value to a second addition device, which adds the respective second force pre-control value to the respective second force setpoint value so that the second drive is controlled in accordance with the sum of the respective second force pre-control value and the respective second force setpoint value. This enables the dynamics achieved by the second drive during the positioning of the machine element to be increased, thus reducing the load on the first drive.

The second determining device preferably determines the respective second force pre-control value by low-pass filtering of the respective provisional force pre-control value. As a result, the second drive is loaded as little as possible without any notable adverse impacts on the relief of the load on the first drive.

According to another aspect of the invention, the object is achieved by a control device including a controller structure as set forth above.

According to still another aspect of the invention, the object is achieved by a machine, wherein the machine comprises a machine element, a first drive, a second drive and a speed-changing device, wherein the first drive acts directly on the machine element and the second drive acts directly on the machine element via the speed-changing device, wherein the first drive and the second drive are controlled by a control device as set forth above.

According to the invention, the first drive and the second drive are controlled by a control device according to the invention.

In the preferred configuration of the machine, the machine is embodied as a machine tool, a production machine or a robot.

BRIEF DESCRIPTION OF THE DRAWING

The above-described properties, features and advantages of this invention and the manner in which these are achieved will become clearer and more plainly comprehensible in conjunction with the following description of the exemplary embodiments explained in more detail in conjunction with the drawings. The drawings show in schematic form.

DETAILED DESCRIPTION OF PREFERRED EMBODIMENTS

Figure 1:
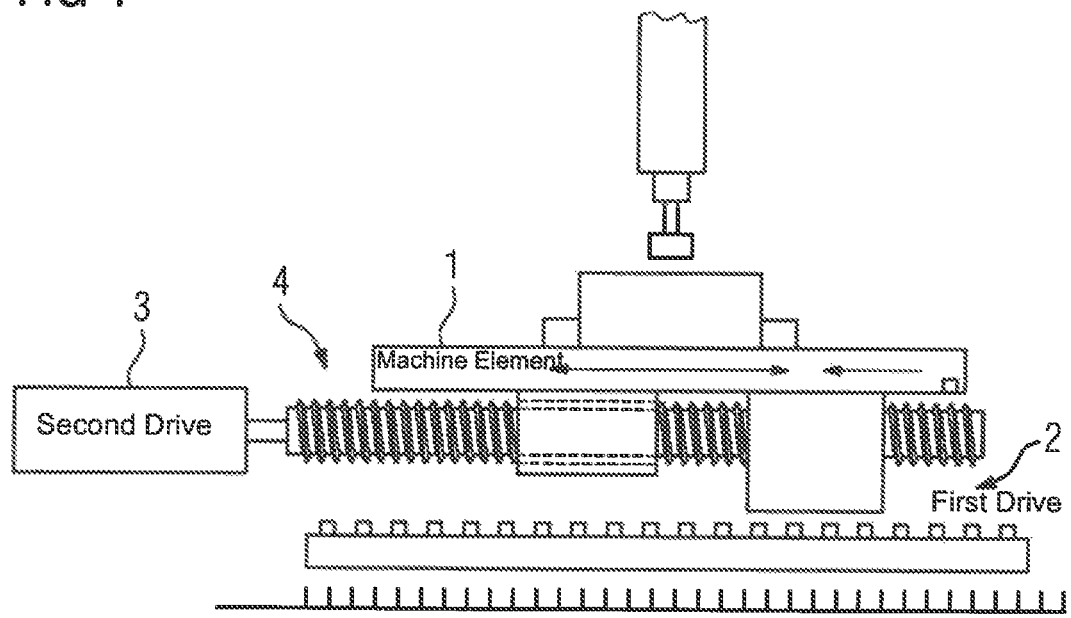
FIG. 1 an example of a machine,
FIG. 2 a controller structure with control system and
FIG. 3 a possible configuration of FIG. 2.

According to FIGS. 1 and 2, a machine comprises a machine element 1. The machine element 1 can, for example, be a workpiece table in accordance with the depiction in FIG. 1. In this case, the machine can, for example, be embodied as a machine tool. Alternatively, the machine element 1 can, for example, be a gripping arm. In this case, the machine can, for example, be embodied as a production machine. Alternatively, the machine element 1 can be a part of a robot. In accordance with the depiction in FIG. 1, the machine element 1 can be moved in a translatory manner. However, the machine element 1 can also be twistable or swivelable in a rotary manner.

The machine element 1 is moved via a first drive 2. The first drive 2 acts directly on the machine element 1. "Directly" means that the first drive 2 acts on the machine element 1 without an intermediate speed-changing device. The first drive 2 can, for example, be embodied as a linear drive according to the depiction in FIG. 1, i.e. as a drive that moves in a translatory manner. In this case, if the first drive 2 is moved by an arbitrary distance, for example 10 mm, the machine element 1 is also moved by exactly the same distance, i.e. according to the example given, 10 mm. However, in other configurations of the present invention, the first drive 2 can be embodied as a rotatory drive, in particular as a so-called torque motor. If, in the case of configuration as a rotatory drive, the first drive 2 is rotated about an arbitrary angle, for example 20°, the machine element 1 is also rotated about exactly the same angle, i.e. 20° according to the example given.

The machine element 1 is furthermore moved via a second drive 3. The second drive 3 acts on the machine element 1 via a speed-changing device 4. The speed-changing device 4 can, for example, be embodied as a gear, as a threaded spindle or as a ball screw drive. Other configurations are also possible. A speed-change ratio i of the speed-changing device 4 can be constant or dependent on a position actual value x of the machine element 1. In accordance with the depiction in FIG. 1, the second drive 3 can, for example, be embodied as a rotatory drive. If, in this case, the second drive 3 is rotated about an arbitrary angle, for example 360°, in the case of a translatory movement of the machine element 1, the machine element is moved by a distance determined by the speed-change ratio i of the speed-changing device 4, for example by the pitch of a threaded spindle or ball screw drive. Even if the machine element 1 also rotates on a rotation of the second drive 3, on a rotation of the second drive 3 about a specific angle of rotation, for example 20°, the angle of rotation about which the machine element 1 is rotated only exceptionally— namely with a speed-change ratio i of 1—matches the angle of rotation about which the machine element is rotated. As a rule, the machine element 1 is rotated about a different angle of rotation, for example with a speed-change ratio i of 2.5 about 50°. In rare exceptional cases, the second drive 3 can also be embodied as a linear drive. However, in this case, it again acts on the machine element 1 via the speed-changing device 4.

The first drive 2 and the second drive 1 are controlled by a control device 5. According to FIG. 2, the control device 5 includes a higher-ranking control system 6 and a controller structure 7. The higher-ranking control system 6 can, for example, be embodied as a numerical control system, as a robot control system or as a MC (motion control) system. The configuration of the controller structure 7 is the core subject of the present invention.

According to FIG. 2, the controller structure 7 includes a position controller 8. The position controller 8 can in particular be embodied as a P controller, i.e. as a proportional controller, in accordance with the depiction in FIG. 2. The position controller 8 receives a position setpoint value $x^*$ from the higher-ranking control system 6. The position controller 8 furthermore receives a position actual value x of the machine element 1 from a measuring device (not shown in the figure). The reception of the position setpoint value $x^*$ and the position actual value x takes place with a position-control clock pulse. Therefore, with each position-control clock pulse the position controller 8 receives a new position setpoint value $x^*$ and a new position actual value x of the machine element 1. The position-control clock pulse is generally in the range of about 1 ms or slightly below this, for example 250 µs, 500 µs, 1 ms or 2 ms.

The position controller 8 determines in each case a speed setpoint value $v^*$ for the machine element 1 on the basis of the respective position setpoint value $x^*$ and the respective position actual value x—in particular from the difference between the respective position setpoint value $x^*$ and the respective position actual value x. The term "on the basis of" is intended to signify that the values mentioned in connection with the term "on the basis of" are all values which are included as a variable in the determination of the value determined in each case. Therefore, in the specific example, although the respective speed setpoint value $v^*$ is dependent on the respective position setpoint value $x^*$ and the respective position actual value x, but not on other variable values. Hence, the term "on the basis of" stands in contrast to the terms "depending on" and "using". These terms are intended to signify that, although the value determined in each case is dependent upon the input values mentioned in each case, this does not exclude the possibility of there being other dependencies on other variable values. The position controller 8 outputs the speed setpoint value $v^*$ determined in each case with the position-control clock pulse.

According to FIG. 2, the controller structure 7 furthermore includes a first speed controller 9. The first speed controller 9 can, for example, be embodied as a P controller in accordance with the depiction in FIG. 2. The first speed controller 9 receives in each case a resulting speed setpoint value and a speed actual value v of the machine element 1 with a first speed-control clock pulse. The reception of the resulting speed setpoint value and the speed actual value takes place with a first speed-control clock pulse. Therefore, with each clock pulse of this kind, the first speed controller 9 receives a new resulting speed setpoint value and a new speed actual value v of the machine element 1. The first speed-control clock pulse is (in terms of time) at the most as high as the position-control clock pulse. However, it can also have a smaller value, for example half that of the position-control dock pulse.

The first speed controller 9 determines a respective first force setpoint value $F1^*$ for the first drive 2 on the basis of the respective resulting speed setpoint value and the respective speed actual value v of the machine element 1 with the first speed-control clock pulse. The first speed controller 9 controls the first drive 2 depending on the first force setpoint value $F1^*$ determined in each case.

To determine the respective speed actual value v of the machine element 1, the controller structure 7 can, for example, include a differentiator 10 to which the respective position actual value x of the machine element 1 is supplied and which determines the respective speed actual value v of the machine element 1 by differentiating the respective position actual value x of the machine element 1. Alternatively, the respective speed actual value v of the machine element 1 can be determined in a different way or acquired directly by means of measurement technology.

To determine the respective resulting speed setpoint value, the controller structure 7 comprises a first determining device 11. The first determining device 11 receives the respective speed setpoint value $v^*$ from the position controller 8 and determines the respective resulting speed setpoint value using the respective speed setpoint value $v^*$. The first determining device 11 outputs the respective resulting speed setpoint value to the first speed controller 9. The first determining device 11 works with the position-control clock pulse, the first speed-control clock pulse or a second speed-control clock pulse, which will be discussed below.

The controller structure 7 furthermore includes a second speed controller 12. The second speed controller 12 can, for example, be embodied in accordance with the depiction in FIG. 2 as a PI controller, i.e. as a proportional integral controller. The first determining device 11 outputs the respective resulting speed setpoint value not only to the first speed controller 9, but also to the second speed controller 12.

If necessary, the speed-change ratio i of the speed-changing device 4 is taken into account in a first adaptation block 13. The second speed controller 12 in each case receives the resulting speed setpoint value and a speed actual value v2 of the second drive 3 with the second speed-control clock pulse. The second speed-control clock pulse is (in terms of time) at the most as high as the position-control clock pulse. However, it can also have a smaller value, for example half that of the position-control clock pulse. As a rule, it is equal to the first speed-control clock pulse. The respective speed actual value v2 of the second drive 3 can differ on the basis of the respective speed actual value v of the machine element 1 because the point of acquisition for the speed actual value v2 of the second drive 3 and the speed actual value v of the machine element 1 are located at different ends of the speed-changing device 4 according to the depiction in FIG. 2.

The second speed controller 12 determines a respective second force setpoint value F2* for the second drive 3 on the basis of the respective resulting speed setpoint value and the respective speed actual value v2 of the second drive 3 with the second speed-control clock pulse. The second speed controller 12 controls the second drive 3 depending on the second force setpoint value F2* determined in each case. Hence, the position controller 8 also indirectly controls the second drive 3 depending on the respective position setpoint value x* and the respective position actual value x.

FIG. 2 also shows several advantageous configurations of the controller structure according to the invention 7. These configurations are only mandatorily combined with one another insofar as they build on one another. Otherwise, they can be implemented independently of one another and combined with one another as required. The configurations are explained below.

In the simplest case, the first determining device 11 is degenerate. In this case, the respective resulting speed setpoint value is identical to the respective speed setpoint value v*. However, preferably, the first determining device 11 also receives a respective speed pre-control value vV with its in accordance with the depiction in FIG. 2 with its working clock pulse. The working clock pulse can be the position-control clock pulse or one of the speed control clock pulses. The respective speed pre-control value vV is specified to the first determining device 11 by the higher-ranking control system 6. The first determining device 11 determines the respective resulting speed setpoint value as the sum of the respective speed setpoint value v* and the respective speed pre-control value vV determined by the position controller 8.

Alternatively or additionally, the controller structure 7 can comprise a second determining device 14. In this case, the second determining device 14 in each case receives an acceleration pre-control value aV from the higher-ranking control system 6 with a pre-control clock pulse. The pre-control clock pulse can match the position-control clock pulse or one of the speed control clock pulses. However, alternatively, the pre-control clock pulse can also have a smaller value, for example half that of the second speed-control clock pulse.

The second determining device 14 determines at least one first force pre-control value F1V for the first drive 2 on the basis of the respective acceleration pre-control value aV. The second determining device 14 outputs the respective first force pre-control value F1V to a first addition device 15. The first addition device 15 adds the respective first force pre-control value F1V to the respective first force setpoint value F1*. Hence, the first drive 2 is controlled in accordance with the sum of the respective first force pre-control value F1V and the first force setpoint value F1*.

The second determining device 14 preferably comprises an adjusting device 16, which converts the respective acceleration pre-control value aV into a provisional force pre-control value. The adjusting device 16 takes into account the mass or the inertia of the machine element 1. In the simplest case, the function of the adjusting device 16 is merely scaling with a suitably selected constant C.

The second determining device 14 then determines the respective first force pre-control value F1V on the basis of the respective provisional force pre-control value. It is in particular possible for the second determining device 14 to implement a high-pass filter 17 by means of which the second determining device 14 determines the respective first force pre-control value F1V by high-pass filtering of the respective provisional force pre-control value. If necessary, the speed-change ratio i of the speed-changing device 4 can be taken into account in a second adaptation block 18.

In addition, the second determining device 14 can determine a respective second force pre-control value F2V for the second drive 3 on the basis of the respective provisional force pre-control value. In this case, the second determining device 14 outputs the respective second force pre-control value F2V to a second addition device 19. The second addition device 19 forms the sum of the respective second force pre-control value F2V and the respective second force setpoint value F2*. Hence, the second drive 3 is controlled in accordance with said sum.

It is possible for the respective second force pre-control value F2V to match the respective provisional force pre-control value. However, the second determining device 14 preferably includes a low-pass filter 20. In this case, the second determining device 14 determines the respective second force pre-control value F2V by low-pass filtering of the respective provisional force pre-control value. If necessary, similarly to the determination of the respective first force pre-control value F1V, the speed-change ratio i of the speed-changing device 4 can also be taken into account for the determination of the respective second force pre-control value F2V in a third adaptation block 21.

It is possible for the controller structure 7 to be constructed in hardware. However, the controller structure 7 is preferably a software block 22 in accordance with the depiction in FIG. 3. In this case, the software block 22 can be part of a computer program 23. In this case, the computer program 23 includes machine code that can be executed by a control device 24. In this case, the control device 24 is programmed by the computer program 23. In this case, it uniformly implements the functions of both the higher-ranking control system 6 and the controller structure 7.

Thus, the controller structure 7 works in a clocked manner, i.e. it receives its variables with the respective clock pulse. If additionally further values are specified to the controller structure 7 as variables, these variables are also specified to the controller structure 7 with their respective clock pulse. Possible variables in particular include the position setpoint value x* and the position actual value and optionally the speed actual value v of the machine element 1, the speed pre-control value vV and the acceleration pre-control value aV.

However, the variables determined by means of the controller structure 7 can also be dependent upon parameters. However, parameters are not variables. Parameters are variables that are specified to the controller structure 7 during the course of its commissioning and are then not changed when it is operational. Parameters can, for example, be proportional gain factors of the position controller 8 and the speed controller 9, 12 and an integration time constant of the second speed controller 12.

The configuration of the controller structure 7 was explained above in connection with a machine element 1 that is moved in a translatory manner, a first drive 2 that is also moved in a translatory manner and a second drive 3 that is moved in a translatory manner. However, the controller structure 7 can also be implemented in a completely analogous manner if the machine element 1 is moved in a rotatory manner and/or the first drive 2 is moved in a rotatory manner and/or the second drive 3 is moved in a rotatory manner. In this case, translatory variables and corresponding rotatory variables would only have to be used as required, for example speed setpoint values or rotational speed setpoint values as required. This does not affect the structural design of the controller structure 7.

Furthermore, the present invention was explained above in connection with a higher-ranking control system 6 and one single controller structure 7, wherein one single machine element 1 is influenced via the controller structure 7. However, the present invention can also be used if a plurality of machine elements 1 are to be influenced in each case via a first drive 2 and a second drive 3. In this case, the higher-ranking control system 6 can be provided uniformly for a plurality of machine elements 1. However, the respective controller structure 7 is provided individually for the respective machine element 1.

To summarize: the present invention therefore relates to the following:

A first drive 2 acts directly on a machine element 1, a second drive 3 via a speed-changing device 4. A position controller 8 receives a position setpoint value x* and a position actual value x of the machine element 1 and determines a speed setpoint value v* for the machine element 1 on the basis of these variables x*, x. A first determining device 11 receives the speed setpoint value v* and determines a resulting speed setpoint value using the speed setpoint value v*. A first speed controller 9 determines a first force setpoint value F1* on the basis of the resulting speed setpoint value and the speed actual value v of the machine element 1 and controls the first drive 2 depending on said force setpoint value F1*. A second speed controller 12 determines a second force setpoint value F2* on the basis of the resulting speed setpoint value and the speed actual value v of the second drive 3 and controls the second drive 3 depending on said force setpoint value F2*.

The present invention has numerous advantages. In particular—apart from the adaptation of the speed-change ratio i of the speed-changing device 4—both speed controllers 9, 12 work with the same reference variable. Configuring the first speed controller 9 as a proportional controller avoids the possibility of a static force being established for the first drive 2. However, this does not adversely affect the damping of oscillations of the machine element 1. A P controller is completely sufficient for this purpose. The solutions according to the invention are robust and inexpensive to implement.

Although the invention has been illustrated in greater detail by the preferred exemplary embodiment, the invention is not restricted by the disclosed examples and other variations can be derived herefrom by the person skilled in the art without departing from the scope of protection of the invention.

What is claimed is:

1. A controller structure for controlling a first drive operating directly on a machine element and a second drive operating on the machine element via a speed-changing device, said controller structure comprising:
    a position controller, which receives at a position-control clock pulse a position setpoint value and a position actual value of the machine element, determines a speed setpoint value for the machine element based on the position setpoint value and the position actual value;
    a first determination device, which receives the speed setpoint value and determines therefrom a resulting speed setpoint value as an output signal;
    a first speed controller, which receives at a first speed-control clock pulse from the first determination device the resulting speed setpoint value and a speed actual value of the machine element, and determines based on the resulting speed setpoint value and the speed actual value of the machine element a first force setpoint value for the first drive, and controls the first drive depending on the first force setpoint value; and
    a second speed controller, which receives at a second speed-control clock pulse from the first determination device the resulting speed setpoint value and a second speed actual value of the second drive, determines therefrom a second force setpoint value for the second drive, and controls the second drive depending on the second force setpoint value.

2. The controller structure of claim 1, wherein the first determining device additionally receives a respective speed pre-control value and determines the resulting speed setpoint value as a sum of the speed setpoint value and the speed pre-control value.

3. The controller structure of claim 1, further comprising:
    a first addition device; and
    a second determining device, which receives at a pre-control clock pulse an acceleration pre-control value, determines based on the acceleration pre-control value a first force pre-control value for the first drive, and outputs the first force pre-control value to the first addition device, which adds the first force pre-control value to the first force setpoint value, so that the first drive is controlled in accordance with a sum of the first force pre-control value and the first force setpoint value.

4. The controller structure of claim 3, wherein the second determining device comprises an adjusting device, which converts the acceleration pre-control value into a provisional force pre-control value, with the second determining device determining the first force pre-control value based on the provisional force pre-control value.

5. The controller structure of claim 4, wherein the second determining device determines the first force pre-control value by high-pass filtering the provisional force pre-control value.

6. The controller structure of claim 4, wherein the second determining device determines a second force pre-control value for the second drive based on the provisional force pre-control value and outputs the second force pre-control value to a second addition device, which adds the respective second force pre-control value to the second force setpoint value, so that the second drive is controlled in accordance with a sum of the second force pre-control value and the second force setpoint value.

7. The controller structure of claim 6, wherein the second determining device determines the second force pre-control value by low-pass filtering the provisional force pre-control value.

8. A control device for controlling a first drive operating directly on a machine element and a second drive operating on the machine element via a speed-changing device, said control device comprising:

a controller structure comprising a position controller, which receives at a position-control clock pulse a position setpoint value and a position actual value of the machine element, determines a speed setpoint value for the machine element based on the position setpoint value and the position actual value, a first determination device, which receives the speed setpoint value and determines therefrom a resulting speed setpoint value as an output signal, a first speed controller, which receives at a first speed-control clock pulse from the first determination device the resulting speed setpoint value and a speed actual value of the machine element, and determines based on the resulting speed setpoint value and the speed actual value of the machine element a first force setpoint value for the first drive, and controls the first drive depending on the first force setpoint value, and a second speed controller, which receives at a second speed-control clock pulse from the first determination device the resulting speed setpoint value and a second speed actual value of the second drive, determines therefrom a second force setpoint value for the second drive, and controls the second drive depending on the second force setpoint value, and a higher-ranking control device specifying, with a position-control clock pulse, to the controller structure position setpoint values of the machine element.

9. The control device of claim 8, wherein the first determining device additionally receives a respective speed pre-control value and determines the resulting speed setpoint value as a sum of the speed setpoint value and the speed pre-control value.

10. The control device of claim 8, wherein the controller structure includes a first addition device, and a second determining device, which receives at a pre-control clock pulse an acceleration pre-control value, determines based on the acceleration pre-control value a first force pre-control value for the first drive, and outputs the first force pre-control value to the first addition device, which adds the first force pre-control value to the first force setpoint value, so that the first drive is controlled in accordance with a sum of the first force pre-control value and the first force setpoint value.

11. The control device of claim 10, wherein the second determining device comprises an adjusting device, which converts the acceleration pre-control value into a provisional force pre-control value, with the second determining device determining the first force pre-control value based on the provisional force pre-control value.

12. The control device of claim 10, wherein the second determining device determines the first force pre-control value by high-pass filtering the provisional force pre-control value.

13. The control device of claim 10, wherein the second determining device determines a second force pre-control value for the second drive based on the provisional force pre-control value and outputs the second force pre-control value to a second addition device, which adds the respective second force pre-control value to the second force setpoint value, so that the second drive is controlled in accordance with a sum of the second force pre-control value and the second force setpoint value.

14. The control device of claim 13, wherein the second determining device determines the second force pre-control value by low-pass filtering the provisional force pre-control value.

15. A machine, comprising:
a machine element;
a speed-changing device;
a first drive operating directly on a machine element;
a second drive operating on the machine element via the speed-changing device; and
a control device comprising a controller structure comprising a position controller, which receives at a position-control clock pulse a position setpoint value and a position actual value of the machine element, determines a speed setpoint value for the machine element based on the position setpoint value and the position actual value, a first determination device, which receives the speed setpoint value and determines therefrom a resulting speed setpoint value as an output signal, a first speed controller, which receives at a first speed-control clock pulse from the first determination device the resulting speed setpoint value and a speed actual value of the machine element, and determines based on the resulting speed setpoint value and the speed actual value of the machine element a first force setpoint value for the first drive, and controls the first drive depending on the first force setpoint value, and a second speed controller, which receives at a second speed-control clock pulse from the first determination device the resulting speed setpoint value and a second speed actual value of the second drive, determines therefrom a second force setpoint value for the second drive, and controls the second drive depending on the second force setpoint value; and a higher-ranking control device specifying, with a position-control clock pulse, to the controller structure position setpoint values of the machine element.

16. The machine of claim 15, constructed in the form of a machine tool, production machine or a robot.

* * * * *